US012095831B1

(12) United States Patent
Ullberg et al.

(10) Patent No.: US 12,095,831 B1
(45) Date of Patent: Sep. 17, 2024

(54) LOCAL SIGNALING OF ENCODED AUDIO FOR DETECTION OF CO-LOCATED DEVICES

(71) Applicant: Google LLC, Mountain View, CA (US)

(72) Inventors: Mans Gustaf Sebastian Ullberg, Stockholm (SE); Alessio Bazzica, Järfälla (SE); Jesús de Vicente Peña, Stockholm (SE); Lionel Koenig Gélas, Stockholm Iän (SE); Esbjörn Dominique, Stockholm (SE); Henrik Fahlberg Lundin, Sollentuna (SE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/500,763

(22) Filed: Nov. 2, 2023

(51) Int. Cl.
*H04L 65/80* (2022.01)
*H04L 65/1093* (2022.01)
*H04L 65/611* (2022.01)
*H04L 67/1095* (2022.01)

(52) U.S. Cl.
CPC ................. *H04L 65/1093* (2013.01)

(58) Field of Classification Search
CPC .......... H04L 65/1093; H04L 65/80; H04L 65/611; H04L 67/1095
USPC ........................................................ 709/204
See application file for complete search history.

(56) References Cited

U.S. PATENT DOCUMENTS

2022/0353330 A1* 11/2022 Kim ................. H04R 5/033
2023/0410656 A1* 12/2023 Lu .................... G08G 1/163

OTHER PUBLICATIONS

Using WebRTC data channels, https://developer.mozilla.org/en-US/docs/Web/API/WebRTC_API/Using_data_channels, retrieved on Apr. 18, 2024, 6 pages.

* cited by examiner

*Primary Examiner* — Jude Jean Gilles
(74) *Attorney, Agent, or Firm* — DORITY & MANNING P.A.

(57) ABSTRACT

A first computing device captures audio data via an audio capture device. The audio data comprises probe signals from second computing devices located within the same area. The first computing device and the second computing devices are connected to a teleconference session. Based on the audio data, the first computing device generates a first encoding of the probe signals received. The first computing device receives a second encoding of probe signals received at a second computing device. The first computing device makes a determination that a degree of similarity between the first encoding and the second encoding is greater than or equal to a threshold degree of similarity. The first computing device generates co-location information identifying the second computing device as a co-located device that is located within the same area as the first computing device.

20 Claims, 6 Drawing Sheets

LOCAL SIGNALING OF ENCODED AUDIO FOR DETECTION OF CO-LOCATED DEVICES

FIELD

The present disclosure relates generally to detecting local devices. More specifically, the present disclosure relates to detecting co-located devices to reduce echo and other deleterious effects.

BACKGROUND

Teleconferencing generally refers to the live exchange of communication data (e.g., audio data, video data, audiovisual data, textual content, etc.) between multiple participants. Common examples include audioconferences, videoconferences, multimedia conferences, Mixed Reality (MR) conferences, and others. Teleconferencing has become an increasingly popular method of communication in a wide range of use-cases, such as business, education, social events, etc. Generally, users will utilize a variety of different types of computing devices to participate in these teleconferences. These devices include smartphones, laptops, wearable devices (e.g., smartwatches, etc.), desktop computers, and specific teleconferencing devices. In most instances, computing devices utilized to participate in teleconferences include peripheral devices to facilitate teleconference participation, such as microphones, cameras, speakers, etc.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes receiving, by a first computing device comprising one or more processor devices, audio data captured via an audio capture device associated with the first computing device, wherein the audio data comprises probe signals from one or more second computing devices located within a same area as the first computing device, and wherein the first computing device and the one or more second computing devices are connected to a teleconference session. The method includes, based on the audio data, generating, by the first computing device, a first encoding of the probe signals received by the first computing device. The method includes receiving, by the first computing device, a second encoding of probe signals received at a second computing device of the one or more second computing devices. The method includes making, by the first computing device, a determination that a degree of similarity between the first encoding and the second encoding is greater than or equal to a threshold degree of similarity. The method includes, responsive to the determination, generating, by the first computing device, co-location information identifying the second computing device as a co-located device that is located within the same area as the first computing device.

Another example aspect of the present disclosure is directed to a computing system comprising one or more processor devices, and one or more non-transitory computer-readable media comprising instructions that when executed by the one or more processor devices cause the computing system to perform operations. The operations include receiving session join information from a first computing device, wherein the session join information is indicative of a request to join a teleconference session hosted by the computing system, and wherein a plurality of second computing devices are connected to the teleconference session. The operations include, responsive to receiving the session join information, providing, to the first computing device, instructions to perform a session join process, wherein the session join process comprises playback of a probe signal for detection of co-located devices that are connected to the teleconference and are located within a same area as the first computing device. The operations include receiving a first encoding from the first computing device and a second encoding from a second computing device of the plurality of second computing devices, wherein the first encoding is based on probe signals received at the first computing device, and wherein the second encoding is based on probe signals received at the second computing device. The operations include determining that the first computing device and the second computing device are co-located based on a degree of similarity between the first encoding and the second encoding.

Another example aspect of the present disclosure is directed to one or more non-transitory computer-readable media comprising instructions that when executed by one or more processors of a first computing device cause the first computing device to perform operations. The operations include receiving audio data captured via an audio capture device associated with the first computing device, wherein the audio data comprises probe signals from one or more respective second computing devices located within a same area as the first computing device, and wherein the first computing device and the one or more second computing devices are connected to a teleconference session. The operations include, based on the audio data, identifying a plurality of first signal components from the probe signals received by the first computing device from the one or more second computing devices. The operations include determining a plurality of first signal component pairs from the plurality of first signal components, wherein each of the first signal component pairs comprises two signal components of a same component type that are received at different times. The operations include generating a first plurality of hash values, wherein each of the first plurality of hash values is based on a corresponding first signal component pair of the plurality of first signal component pairs.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
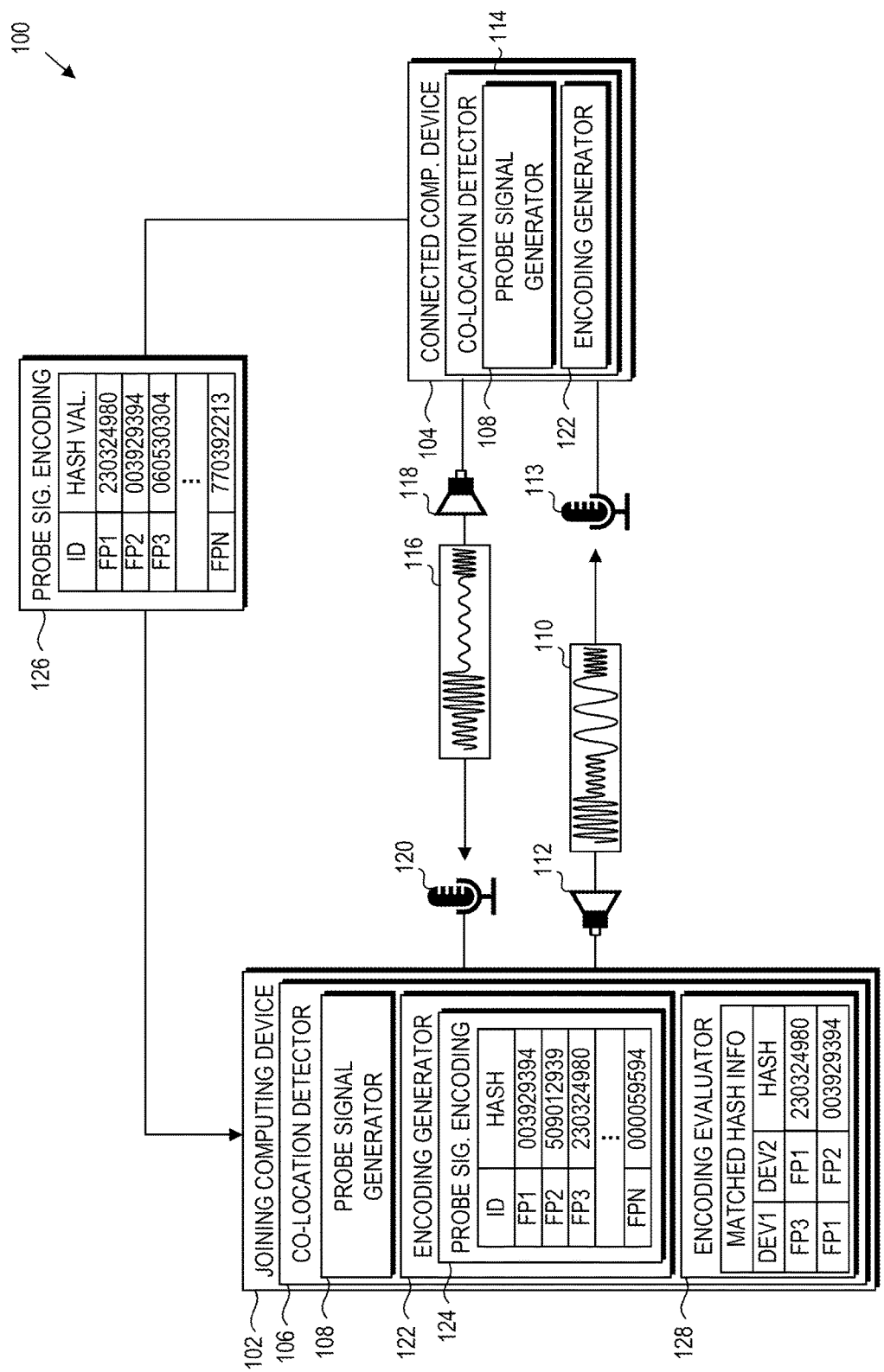
FIG. 1 is an overview block diagram for a computing environment in which an example computing device performs local signaling of encoded audio for detection of co-located devices according to some implementations of the present disclosure.

Reference numerals that are repeated across plural figures are intended to identify the same features in various implementations.

DETAILED DESCRIPTION

Generally, the present disclosure relates to detecting local devices. More specifically, the present disclosure relates to detecting co-located devices to reduce echo and other deleterious effects. In particular, due to the increasing popularity of teleconferencing, it is not uncommon for the computing devices of two participants to be "co-located." As described herein, "co-located" devices generally refer to two (or more) devices that are within an audible range of each other. For example, it is relatively common for two coworkers to participate in the same teleconference from adjacent cubicles. If audio produced by the speakers of the device in one cubicle is within range to be captured by the microphone of the device in the other cubicle, the devices can be considered "co-located" devices. For another example, the computing devices of two students participating in the same teleconference from different classrooms may not be considered co-located devices.

In some instances, feedback caused by co-located devices can substantially reduce the communication quality of a teleconference session. More specifically, when two computing devices are co-located, audio captured by one device can be captured by the other device due to their proximity. This can lead to a feedback loop called "howling", in which the inadvertently captured audio is repeatedly played, re-played, and re-captured by both of the co-located devices, quickly drowning out any other sound in the teleconference session and rendering vocal communication nearly impossible.

To reduce the negative effects of co-location, some computing devices can perform device-level corrective actions by processing incoming audio or adjusting particular settings of the computing device. For example, the computing device can reduce a volume parameter for an audio output device, reduce a sensitivity parameter for an audio capture device, process incoming audio with echo reduction algorithms, etc. Additionally, the computing system that hosts, or otherwise orchestrates, the teleconference session can perform system-level corrective actions, such as processing the incoming audio to reduce echo, or informing devices of co-location so that device-level corrective actions can be performed.

Many corrective actions cannot be performed (or cannot be performed effectively) before co-location is detected. However, detecting co-located devices can be prohibitively difficult. First, due to the wide range of device types utilized to participate in teleconferences, there is no standardized method for local device detection that is shared between different devices. As such, an effective detection technique must leverage existing features that are common to most types of devices. Further, devices can be located within the same area without being co-located. To follow the previous example of the two adjacent cubicles, a third device located in a closed-door office across the hall from the cubicles may not be considered co-located because the device in the office is not within range to capture audio from the devices in the cubicles. As such, detection techniques based on geolocation information (e.g., IP address, geolocation coordinates, etc.) can be inaccurate.

Accordingly, implementations of the present disclosure propose local signaling of encoded audio for detection of co-located devices. More specifically, a computing device that joins a teleconference session can broadcast audio of a local probe signal using speakers. Connected computing devices that are already connected to the teleconference session can also broadcast probe signals using speakers. As described herein, a "probe signal" can refer to an audio signal that includes a unique combination of signal components. The probe signal audio can be audio that is imperceptible or barely perceptible to humans. Each device can generate an encoding based on the signal components of each probe signal received by the device, and can exchange encodings amongst themselves. For example, the joining computing device can identify pairs of signal components from the probe signals, and can generate an encoding that includes hash values to represent each pair of signal components.

As such, the joining computing device can generate an encoding and can also receive encodings from the connected computing devices. The joining computing device can determine a degree of similarity between the encoding generated by the joining computing device and an encoding received from one of the connected computing devices. If the degree of similarity between the generated encoding and the received encoding is above a threshold, the joining computing device can generate co-location information. The co-location information can identify the connected computing device as being a co-located device that is located within the same area as the joining computing device. The joining computing device can send the co-location information to the connected computing device and/or to a computing system that hosts the teleconference. Based on the co-location information, the joining computing device, the connected computing device, and/or the computing system can perform corrective actions to reduce, or eliminate, echo and other deleterious effects caused by co-location of computing devices participating in the same teleconference session. In such fashion, the joining computing device can efficiently and effectively detect co-located devices using mechanisms common to most, or all, computing devices.

Implementations of the present disclosure provide a number of technical effects and benefits. As one example technical effect and benefit, implementations of the present disclosure can more effectively reduce, or eliminate, the deleterious effects of device co-location than conventional techniques. For example, rather than utilizing location information, which can be substantially inaccurate, or proprietary local detection mechanisms, implementations of the present disclosure can leverage existing hardware resources of computing devices (e.g., audio output devices and audio capture devices) to accurately detect co-located devices.

For another example technical effect and benefit, implementations of the present disclosure can detect co-located devices and perform corrective actions with little or no bandwidth expenditure. For example, conventional co-location detection techniques often necessitate the exchange of data between computing devices and the computing system that hosts the teleconference session, thus requiring substantial bandwidth expenditure (e.g., to provide location information, coordinate messaging between devices, etc.). However, implementations of the present disclosure only exchange small encodings of locally detected signals, thus substantially reducing the bandwidth expenditure required to facilitate detection of co-located devices.

With reference now to the Figures, example implementations of the present disclosure will be discussed in further detail.

FIG. 1 is an overview block diagram for a computing environment 100 in which an example computing device performs local signaling of encoded audio for detection of co-located devices according to some implementations of the present disclosure. More specifically, a computing environment 100 can include a number of different computing devices and systems, such as joining computing device 102 and connected computing device 104. The joining computing device 102 can be a computing device that is joining a teleconference session. As described herein, a teleconference session can refer to an active communication session in which multiple participants exchange communication data in real-time (e.g., audio data, video data, multimedia data, etc.). Communication data can be exchanged within a teleconference session either indirectly via a hosting computing system or directly via a peer-to-peer (P2P) session.

The joining computing device 102 can include a co-location detector 106. The co-location detector 106 can be utilized to detect other devices participating in the teleconference session that are co-located with the joining computing device 102. Two devices can be considered "co-located" if the devices are within an audible range of each other. For example, if the joining computing device 102 and the connected computing device 104 both participate in the same teleconference session from the same classroom, they can be considered co-located.

The joining computing device 102 can utilize the co-location detector 106 to reduce, or eliminate, feedback caused by co-located devices. More specifically, when two computing devices are co-located, audio captured by one device can be captured by the other device due to their proximity. This can lead to a feedback loop called "howling", in which the inadvertently captured audio is repeatedly played, re-played, and re-captured by both of the co-located devices, quickly drowning out any other sound in the teleconference session and rendering vocal communication nearly impossible.

To detect co-located devices, the co-location detector 106 can include a probe signal generator 108. The probe signal generator 108 can generate a randomized joining probe signal 110 that includes a unique combination of probe signal components. Signal components, as described herein, can refer to tones, frequencies, or other audio components included in an audio signal. The joining probe signal 110 can be played via an audio output device 112 so that the joining probe signal 110 can be received via the audio capture devices of any other devices co-located with the joining computing device 102. The probe signals can be leveraged to determine whether devices are co-located. More specifically, any device already connected to a teleconference session that includes the probe signal generator 108, such as the connected computing device 104, can be configured to detect co-located devices by generating a probe signal and listening for probe signals from other devices. The devices can generate encodings based on received probe signals that can be used to identify co-located devices.

The connected computing device 104 can include a co-location detector 114 that is the same as, or substantially similar to, the co-location detector 106. The co-location detector 114 can also include the probe signal generator 108. The co-location detector 114 can utilize the probe signal generator 108 in conjunction with the probe signal generator 108 of the co-location detector 106 to assist the joining computing device 102 in detecting co-location. To do so, the co-location detector 106 of the joining computing device 102 can broadcast the joining probe signal 110 via the audio output device 112, and the broadcast can be received via an audio capture device 113 of the connected computing device 104.

The connected computing device 104 can utilize the probe signal generator 108 to generate a connected probe signal 116 via an audio output device 118. The joining computing device 102 can receive the connected probe signal 116 via an audio capture device 120. The co-location detector 106 can include an encoding generator 122 that generates a joining probe signal encoding 124. The joining probe signal encoding 124 can encode the probe signals received via the audio capture device 120. To follow the depicted example, the encoding generator 122 can identify probe signal components FP1-FPN from the connected probe signal 116, and can generate hash value representations of the signal components for inclusion in the joining probe signal encoding 124. In addition, the probe signal components FP1-FPN can include probe signal components from the joining probe signal 110 from audio inadvertently captured by the audio capture device 120. In other words, the probe signal encoding 124 can encode portions of both the joining probe signal 110 and the connected probe signal 116.

Similarly, the connected computing device 104 can include the encoding generator 122, and can utilize the encoding generator 122 to generate a connected probe signal encoding 126. The connected probe signal encoding 126 can include hash value representations of the probe signal components of the joining probe signal 110. Like the joining probe signal encoding 124, the connected probe signal encoding 126 can represent portions of the connected probe signal 110 that are inadvertently captured at the audio capture device 113.

The connected computing device 104 can transmit the connected probe signal encoding 126 to the joining computing device 102. The co-location detector 106 of the joining computing device 102 can include an encoding evaluator 128. The encoding evaluator 128 can compare the joining probe signal encoding 124 and the connected probe signal encoding 126. Based on a degree of similarity between the encodings, the encoding evaluator 128 can determine whether the connected computing device 104 and the joining computing device 102 are co-located. In such fashion, computing devices can quickly, efficiently, and securely perform co-location detection to reduce or eliminate the deleterious effects of co-location.

Figure 2:
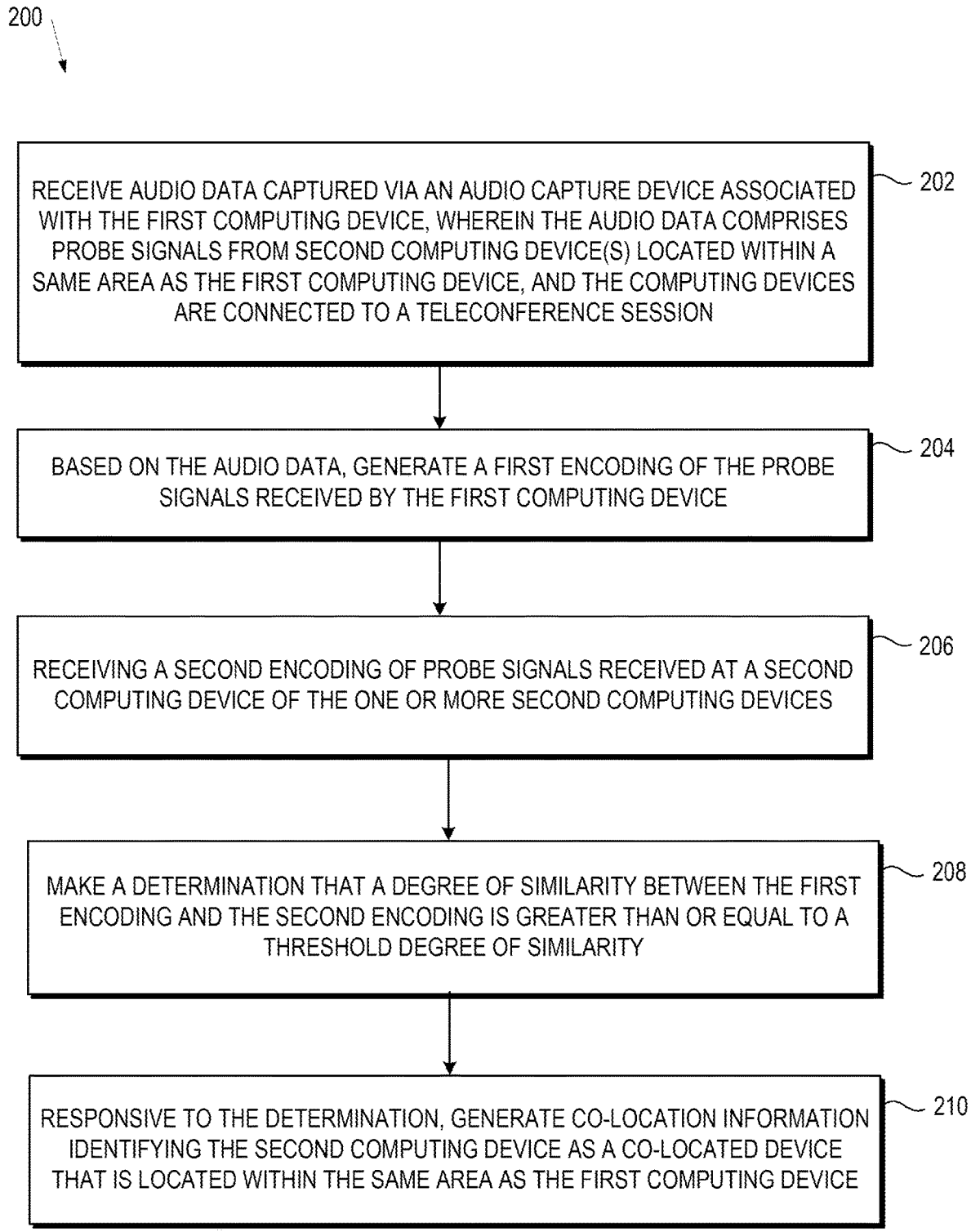
FIG. 2 is a flow diagram of an example method for locally detecting co-located devices via local signaling of encoded audio according to some implementations of the present disclosure.

FIG. 2 is a flow diagram of an example method 200 for locally detecting co-located devices via local signaling of encoded audio according to some implementations of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the co-location detector 106 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, processing logic of a computing device can receive audio data captured via an audio capture device. The audio data can include probe signals from other computing devices located within a same area as the computing device. For example, the other computing devices can each generate a random probe signal and can play the probe signal via an audio output device (e.g., speakers, etc.). If the other computing devices are located within the same audible area as the computing device, the computing device will receive the probe signals from the other computing devices via an audio capture device (e.g., a microphone, etc.).

The probe signals received from the other computing devices can be audio signals that include a number of random signal components, or sounds, that can individually be detected over time by using signal processing or other techniques. For example, a probe signal may be, or otherwise include, a combination of pure tones randomly selected from a finite set of frequency values (e.g., a set of linearly spaced frequency values in the frequency range of 19-21 kHz, etc.). Probe signals will be discussed in greater detail with regards to FIG. 4.

In some implementations, prior to receiving the audio data, or concurrently with receiving the audio data, the processing logic can determine a randomized probe signal. The randomized probe signal can include a combination of random probe signal components. The processing logic can cause playback of the randomized probe signal via an audio output device associated with the computing device. For example, the processing logic can cause playback of the randomized probe signal via a speaker device built into the computing device.

In some implementations, prior to determining the randomized probe signal, the processing logic can provide session join information indicative of a request to join the teleconference session. For example, if the teleconference session is hosted by a computing system, the processing logic can provide the session join information to the computing system hosting the teleconference. For another example, if the teleconference session is a P2P-hosted session, the processing logic can provide the session join information to some, or all, of the devices connected to the session. The processing logic can join the teleconference session responsive to providing the session join information.

In some implementations, prior to determining the randomized probe signal, the processing logic can receive identifying instructions that include instructions to cause playback of the randomized probe signal. For example, the processing logic can receive the identifying instructions from a computing system that hosts the teleconference session.

In some implementations, the probe signal(s) received by the processing logic can be probe signals from a signaling device. A signaling device can be a multi-purpose device capable of signaling (e.g., speakers, a smartphone, a laptop, etc.), a purpose-specific device (e.g., a device including speakers configured to generate probe signals), or a component or portion of a teleconference-specific device (e.g., a device that includes multiple microphones to facilitate teleconference participation in a conference room). Rather than the joining device and the connected devices each generating and broadcasting probe signals, the signaling device can broadcast probe signal(s) that can be captured by the connected device(s) and the joining device. The devices can then generate and exchange encodings as described previously. In this manner, probe signals can be more efficiently generated, thus reducing the likelihood of inadvertent audio capture or general inaccuracies inherent to distributed generation and detection of probe signals on a per-device basis.

At operation 204, the processing logic can generate an encoding of the probe signals received at the computing device. Specifically, in some implementations, each of the probe signals can include a set of randomized probe signal components. A probe signal component can be a sound, noise, tone, etc. played over a certain period of time. For example, one probe signal component can be a 19 kHz tone played for 1 second, and another probe signal component can be a 20 kHz tone played for one second. These probe signal components can be arranged with no overlap, partial overlap, and/or full overlap. To follow the previous example, the first 0.5 seconds of the 20 kHz tone can be played concurrently with the last 0.5 seconds of the 19 kHz tone, or can be played subsequent to the 19 kHz tone.

In some implementations, probe signal components can be selected for inclusion in a probe signal in a random or semi-random manner. For example, each of the probe signal components can be a tone selected from a finite set of frequency values. In some implementations, the probe signal components can each be randomly selected in the same manner. More specifically, as illustrated in FIG. 1, the computing devices utilized to participate in a teleconference can each include a probe signal generator that generates probe signals in a format that is compatible with the other computing devices. In this manner, probe signals generated at one computing device can be received and parsed at another computing device.

In some implementations, the processing logic can identify a plurality of signal components from the probe signals from the other computing devices. The identified probe signal components can include signal components from any connected computing devices within an audible area, or range, of the joining computing device. For example, assume that a joining computing device joins a teleconference session from a classroom, and that two devices already connected to the teleconference session are also located in the classroom. While the joining computing device joins the teleconference session, the connected computing devices can determine to generate and play probe signals (e.g., based on instructions from a computing system hosting the teleconference, based on receiving a P2P join request received from the joining computing device, etc.). If one of the probe signals includes a 19 kHz probe signal component, and the other probe signal includes a 20 kHz probe signal component, the probe signal components identified by the joining computing device can include both the 19 kHz and the 20 kHz probe signal components.

Additionally, or alternatively, in some implementations, the identified probe signal components can include signal components from the joining computing device. To follow the previous example, the joining computing device can generate and play a randomized probe signal that includes random probe signal components in the same manner as the connected computing devices. Due to the proximity between the audio capture device and the audio output device of the joining computing device, the joining computing device can capture its own probe signal, and can identify probe signal components from its own probe signal. As such, the probe signal components identified by the joining computing device can be identified from both the probe signal of the joining computing device and the probe signal(s) of connected computing device(s).

In some implementations, the encoding of the probe signal(s) received by the joining computing device can be, or otherwise include, a hash or a number of different hashes. The joining computing device can utilize any type or manner of hashing schema to generate the hashes. For example, the joining computing device can generate a single hash representation that represents all received probe signals. For another example, the joining computing device can generate a hash representation of each probe signal component. Alternatively, in some implementations, the joining computing device can utilize some other manner of encoding technique to generate the encoding. For example, the joining computing device can process all the received probe signals with a machine-learned model to generate an intermediate representation of the probe signals. For another example, the joining computing device can separately process each identified probe signal component with a machine-learned model to generate intermediate representations of each of the probe signal components.

In some implementations, to generate the probe signal encoding, the processing logic can determine signal component pairs from the identified signal components. For each signal component pair, the two paired signal components can have the same component type and can be received at different times. A "type" of probe signal component can refer to a particular frequency, duration, type of sound, type of tone, etc. For example, one probe signal component of a pair can be a 19 kHz tone captured at 0:00:05 (e.g., 5 seconds after the joining computing device began receiving probe signals), and the other probe signal component of the pair can be a 19 kHz tone captured at 0:00:06.

In some implementations, a probe signal component can be included in multiple probe signal pairs. To follow the previous example, if another 19 kHz probe signal component was captured at 0:00:03, probe signal pairs could be formed between the 0:00:06 and 0:00:05 probe signal components, the 0:00:06 and the 0:00:03 probe signal components, the 0:00:05 and the 0:00:03 components. Specifically, the processing logic can select one of the identified probe signal component of the plurality of signal components, and can identify multiple other probe signal components of the same component type that are received prior to the identified probe signal components. The processing logic can determine a subset of the signal component pairs that each include the identified probe signal component and one of the other previously received probe signal components of the same component type. In some implementations, the identified probe signal component can be a random probe signal component selected for inclusion in the randomized probe signal generated by the joining computing device. Alternatively, in some implementations, the identified probe signal component can be a probe signal component included in one of the probe signals received from a connected computing device.

In some implementations, the processing logic can generate signal component pair information. The signal component pair information can describe each of the signal component pairs. Specifically, for each of the pairs, the signal component pair information can include component identifiers for the paired signal components, the times at which the paired signal components were captured, and/or the difference between the times at which the paired signal components were captured.

In some implementations, the processing logic can process the signal component pair information with a hashing schema to obtain hash values. Each of the hash values can be derived from the signal component pair information for a corresponding signal component pair. For example, for a pair of 19 kHz probe signal components captured at 0:00:05 and 0:00:06, the corresponding signal component pair information can include the time at which the probe signal components were captured (e.g., 0:00:05 and 0:00:06), the difference between the times at which the components were captured (e.g., 0:00:01), identifiers for the probe signal components (e.g., an alphanumeric identifier, etc.), etc. The processing logic can apply a hashing schema to that portion of the signal component pair information to generate a hash representation of the pair of signal components. As such, each pair of signal components can be represented by a corresponding hash.

At operation 206, the processing logic can receive probe signal encodings from the connected computing devices. The probe signal encodings can be received from a sending entity. In some implementations, the sending entity can be the connected computing devices that are connected to the teleconference session. Additionally, or alternatively, in some implementations, the sending entity can be a computing system that hosts the teleconference session.

These received probe signal encodings can be encodings of probe signals received at the other computing devices. For example, if the joining computing device broadcasts a joining probe signal, the received probe signal encoding from one of the other computing devices can encode the joining probe signal if the other computing device is within the same area as the joining computing device.

In some implementations, the probe signal encodings received from the connected computing devices can include hash values. These hash values can be generated in the same manner as the hash values generated by the joining computing device. More specifically, the probe signal encoding can include hash values generated by applying the same hashing schema as the hashing schema used by the joining computing device to probe signal components received by the connected computing devices. For example, a connected computing device that plays a probe signal received by the joining computing device is likely within an audible distance of the joining computing device. As such, the connected computing device can also receive probe signals from the joining computing device and any other co-located device(s). In the same manner as the joining computing device, the connected computing device can derive each hash value from a corresponding signal component pair identified by the connected computing device.

At operation 208, the processing logic can make a determination that a degree of similarity between the received probe signal encoding and the generated probe signal encoding is greater than or equal to a threshold degree of similarity. For example, assume that the received probe signal encoding and the generated probe signal encoding both include hash values. If a number of hash values shared between the encodings is greater than or equal to a threshold number of hash values, the processing logic can make the determination that the computing devices are co-located.

As described previously, in some implementations, the probe signal encoding generated by the joining computing device and the probe signal encoding received from the connected computing device can both include hash values. To make the determination, the processing logic can identify a number N of common hash values that are included in both the encodings. If the number N of common hash values is greater than a threshold number M of common hash values, the processing logic can determine that the devices are co-located.

For example, returning to FIG. 1, the encoding evaluator 128 includes matched hash information. The matched hash information can identify the N common hash values that are included in both the probe signal encoding 124 and the probe signal encoding 126. As illustrated, the probe signal encoding 124 and the probe signal encoding 126 both include hashes 230324980 and 003929394 due to one of the probe signals being captured by both devices. In this manner, by implementing a threshold degree of similarity, implementations of the present disclosure can reduce the likelihood of inaccurate detection of co-located devices.

Returning to FIG. 2, at operation 210, the processing logic can generate co-location information responsive to the determination (e.g., the determination made at operation 208). The co-location information can identify the other computing device as a co-located device that is located within the same area as the joining computing device. For example, assume that the probe signal encoding received from the connected computing device includes an identifier for the connected computing device. If the joining computing device makes the determination that the other computing device is co-located, the co-location information can include the identifier for the connected computing device.

In some implementations, the processing logic can perform a corrective action in response to generating the co-location information. In some implementations, performing the corrective action can include modifying parameter(s) of the computing device, or an application executed by the processing logic (e.g., a teleconferencing application). For example, the processing logic can modify a playback volume parameter associated with a playback volume of an audio output device. For another example, the processing logic can modify a recording sensitivity parameter associated with a recording sensitivity of an audio capture device. For another example, the processing logic can modify a suppression parameter associated with activation of a noise suppression process. For yet another example, the processing logic can provide the co-location information to the connected computing device and/or to a computing system that hosts the teleconference session.

In some implementations, the processing logic can receive another encoding of probe signals from another connected computing device. The processing logic can make a determination that a degree of similarity between the encoding generated by the joining computing device and the encoding generated by the other connected device is greater than or equal to the threshold degree of similarity, and can generate additional co-location information identifying that device as being a co-located device.

Figure 3:
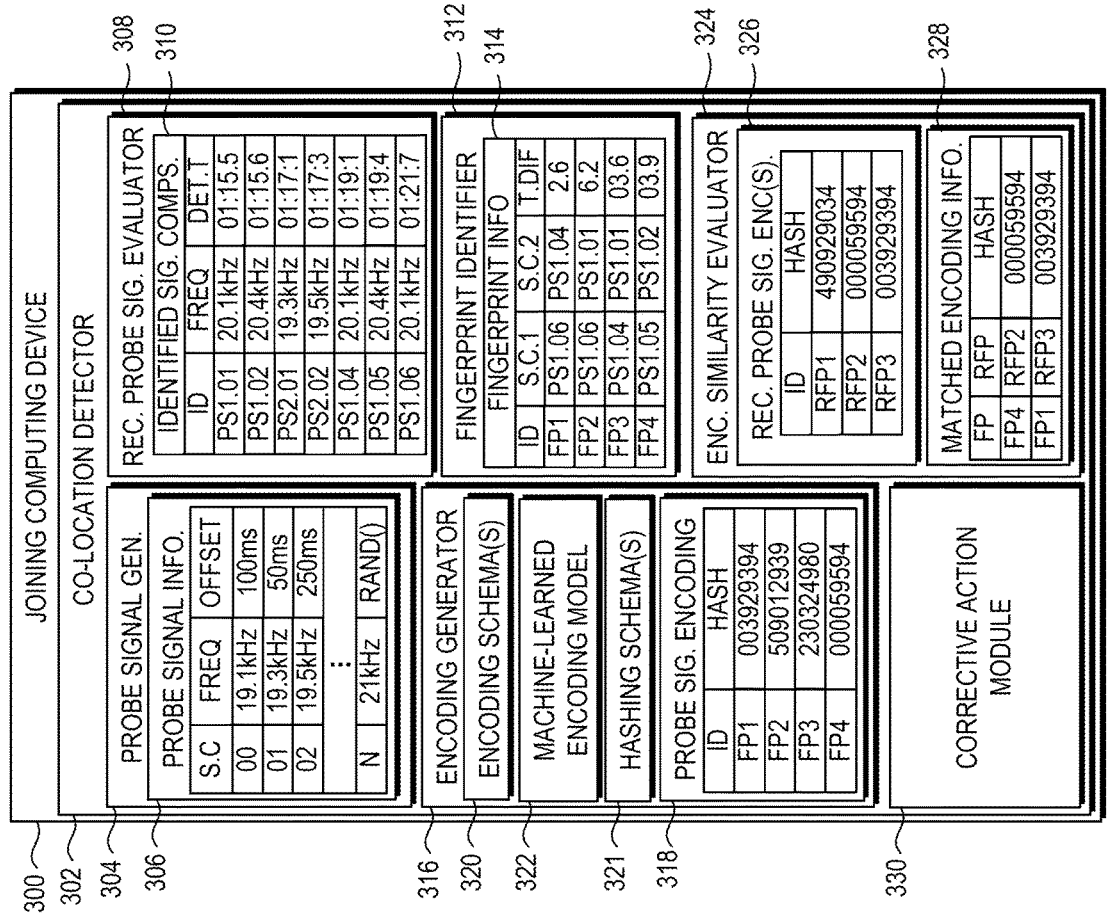
FIG. 3 is a block diagram of an example joining computing device that detects co-located devices via local signaling of encoded audio according to some implementations of the present disclosure.

FIG. 3 is a block diagram of an example joining computing device 300 that detects co-located devices via local signaling of encoded audio according to some implementations of the present disclosure. In particular, the joining computing device 300 can include a co-location detector 302. The co-location detector 302 can be utilized to detect other devices participating in a teleconference session that are co-located with the joining computing device 300 in the same manner as previously described with regards to the co-location detector 106 of FIG. 1. The co-location detector 302 can be implemented via any hardware, software, programmatic instructions, or any combination thereof.

The co-location detector 302 can include a probe signal generator 304. The probe signal generator 304 can generate probe signals for playback using an audio output device. The probe signals generated by the probe signal generator 304 can be perceptible or imperceptible to human hearing. For example, the probe signal generator 304 can generate probe signals at frequencies outside the normal range of human hearing. For another example, certain portions of the probe signal can be audible to human hearing while others can be inaudible.

To generate a probe signal, the probe signal generator 304 can select probe signal components for inclusion in the probe signal. The probe signal components can be various sounds, tones, frequencies, etc. played over a period of time. The probe signal components can be randomly selected and/or generated. For example, the probe signal components can each be a combination of pure tones randomly selected from a finite set of frequency values (e.g., the set of 100 linearly spaced frequency values in the 19-21 kHz) and distributed over time (e.g., partially overlapping with fixed or random offsets).

Specifically, the probe signal generator 304 can generate probe signal information 306. The probe signal information 306 can describe each probe signal component selected for the probe signal. To follow the depicted example, the probe signal information can describe a probe signal component with a frequency of 19.1 kHz and an offset of 100 ms, another probe signal component with a frequency of 19.3 kHz and an offset of 50 ms, and another probe signal component with a frequency of 19.5 kHz and an offset of 250 ms.

The co-location detector 302 can play, or can cause playback, of the probe signal generated by the probe signal generator 304. The joining computing device 300 can receive and capture probe signals from connected computing devices that are co-located with the joining computing device 300. The co-location detector 302 can include a recorded probe signal evaluator 308. The recorded probe signal evaluator 308 can evaluate recorded probe signals to identify probe signal components from the probe signals. The recorded probe signal evaluator 308 can generate identified signal component information 310. The identified signal component information 310 can describe each of the identified signal components.

In particular, the identified signal component information 310 can include an identifier for each signal component, a frequency for each signal component, and a detection time for each signal component. To follow the depicted example, the identified signal component information 310 can describe a probe signal component PS1.01 with a frequency of 20.1 kHz and a detection time of 1:15.5.

The co-location detector 302 can include a fingerprint identifier 312. The fingerprint identifier 312 can identify audio "fingerprints" formed by pairs of probe signal components. As described herein, a "fingerprint" can refer to a pair of probe signal components of the same component type that are received at different times. The fingerprint identifier 312 can generate fingerprint information 314. The fingerprint information 314 can describe each fingerprint identified from the received probe signal components evaluated by the received probe signal evaluator 308. For example, for fingerprint FP1, the fingerprint information 314 can include the probe signal component identifiers PS1.06 and PS1.04 from the identified signal component information 310. The fingerprint information 314 can also include the time difference between the times at which the signal components were captured (e.g., 2.6 seconds).

The co-location detector 302 can include an encoding generator 316. The encoding generator 316 can generate a generated probe signal encoding 318 that encodes the probe signals received at the joining computing device 300. In some implementations, the encoding generator 316 can include encoding schema(s) 320. The encoding schemas can be applied to the received probe signals to generate non-hash encodings. The encoding generator 316 can also include hashing schema(s) 321. The encoding generator 316 can apply one of the hashing schema(s) 321 to the fingerprint information 314 to generate the generated probe signal encoding 318. Additionally, or alternatively, in some implementations, the encoding generator 316 can include machine-learned encoding models 322. The machine-learned encoding models 322 can be trained to process the fingerprint information 314, and/or the probe signals (e.g., audio data that includes the probe signals), to generate the generated probe signal encoding 318. To follow the depicted example, the generated probe signal encoding 318 can include hash values for each of the fingerprints described by the fingerprint information 314 (e.g., FP1-FP4).

The co-location detector 302 can include an encoding similarity evaluator 324. The encoding similarity evaluator can 324 can receive a received probe signal encoding 326. In some implementations, the received probe signal encoding 326 can be received from some other computing device(s) connected to the teleconference. Additionally, or alternatively, in some implementations, the received probe signal encoding 326 can be received from a computing system hosting the teleconference.

In some implementations, the encoding similarity evaluator 324 can evaluate temporal consistency between encodings. If the identified signal component information 310 includes absolute extraction time information, the encoding similarity evaluator 324 can check if the sequence of fingerprint hash values that match across devices are temporally consistent. More specifically, as time is tracked on all the devices at the same pace (assuming that clock drift can be neglected), consistency can be assessed by measuring the absolute extraction timestamp difference, $\Delta t = t_{L_i} - t_{R_j}$ and by evaluating the distribution of the $\Delta t$, as there is one distribution for each pair of devices. If they are evenly distributed, then the matches are likely to be false positives. If instead, the $\Delta t$ values are mainly distributed around one narrow range, the matches with a $\Delta t$ value that falls in such a range are likely to be true positives.

When a degree of temporally consistent matches between two devices are observed, the encoding similarity evaluator 324 can determine close proximity between devices. The encoding similarity evaluator 324 can also leverage transitive inference: if devices A and B are detected in close proximity and if B and C are detected in close proximity, the encoding similarity evaluator 324 can determine that A and C are also in close proximity. The encoding similarity evaluator 324 can discover the groups of devices at some point in time or continuously. In this manner, the encoding similarity evaluator 324 can detect when a device moves from one group to another one. In this instance, the distributions of $\Delta t$ values for the temporally consistent matches between the device that changes group and the devices in the initial and in the new group will also change accordingly allowing to detect the new proximity configuration.

Specifically, if the teleconference is hosted by a computing system, the joining computing device 300 and the other devices send encoded locally extracted fingerprints to the server (e.g., a virtual or physical server, a distributed system on a cloud, etc.) and the server compares the hash values and the fingerprint extraction timestamps from all the devices looking for temporally consistent matches across devices. Based on such an analysis, the server infers the groups of devices that share the same acoustic space. As such, it should be noted that some of the operations performed by the co-location detector 302 can also be performed by a co-location detector of the computing system.

Alternatively, if the teleconference is P2P-hosted, the encodings of the locally extracted fingerprints can be stored in a suitable data structure that allows searching by hash value and removing too old entries, and can broadcasted to all other devices, received as remote fingerprints and matched against the local fingerprints by comparing the hash values. If a device finds enough temporally consistent matches, the device determines that it is in close proximity with the associated device.

It should be noted that the received probe signal encoding 326 is illustrated as a single received probe signal encoding only to more easily illustrate various implementations of the present disclosure. However, in some implementations, the received probe signal encoding 326 can be, or otherwise include, multiple probe signal encodings generated by multiple computing devices connected to the teleconference session. For example, upon receiving a session join request, a computing system hosting the teleconference can instruct each and every connected computing device to capture audio and generate an encoding of the captured audio. The computing system can further instruct the devices to exchange the encodings amongst themselves. In this manner, the joining computing device 300 can receive probe signal encodings from every other device connected to the teleconference. Actions described above by the computing system can also be performed by computing devices connected to a P2P teleconference.

The encoding similarity evaluator 324 can evaluate a similarity between the generated probe signal encoding 318 and the received probe signal encoding 326. To do so, the encoding similarity evaluator 324 can generate matched encoding information 328. The matched encoding information 328 can indicate encodings included in in both the generated probe signal encoding 318 and the received probe signal encoding 326. To follow the depicted example, the matched encoding information 328 can indicate that the hashes "000059594" and "003929394" are included in both the generated probe signal encoding 318 and the received probe signal encoding 326. Based on the matched encoding information 328, the encoding similarity evaluator can determine a degree of similarity between the encodings, and thus, whether the devices associated with the encodings are co-located.

The co-location detector 302 can include a corrective action module 330. The corrective action module 330 can perform corrective actions to reduce the deleterious effects of co-location if the encoding similarity evaluator 324 determines that the joining computing device 300 is co-located with another device. For example, the corrective action module 330 can modify parameter(s) of the joining computing device 300 or an application/operating system executed by the joining computing device 300 (e.g., a playback volume parameter, a recording sensitivity parameter, a suppression parameter, etc.).

Figure 4:
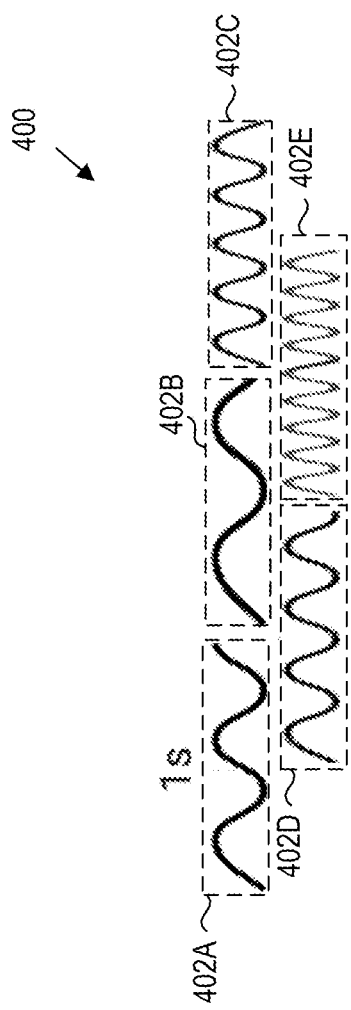
FIG. 4 is an illustration of an example probe signal that includes a plurality of signal components according to some implementations of the present disclosure.

FIG. 4 is an illustration of an example probe signal that includes a plurality of signal components according to some implementations of the present disclosure. In particular, the probe signal 400 includes probe signal components 402A—

402F. As depicted, the probe signal component 402A can be the first probe signal component to be played during playback. The probe signal components 402B and 402C are placed sequentially after the probe signal component 402A. The probe signal component 402B can have a lower frequency than the probe signal component 402A, and the probe signal component 402C can have a higher frequency.

The probe signal component 402D can be placed to partially overlap the probe signal component 402A. To follow the depicted example, the probe signal component 402D can be placed to begin playback 0.5 seconds after the probe signal component 402A. In this manner, probe signal components can be selected and placed in a randomized manner to create a unique probe signal that uniquely identifies a particular computing device.

Figure 5:
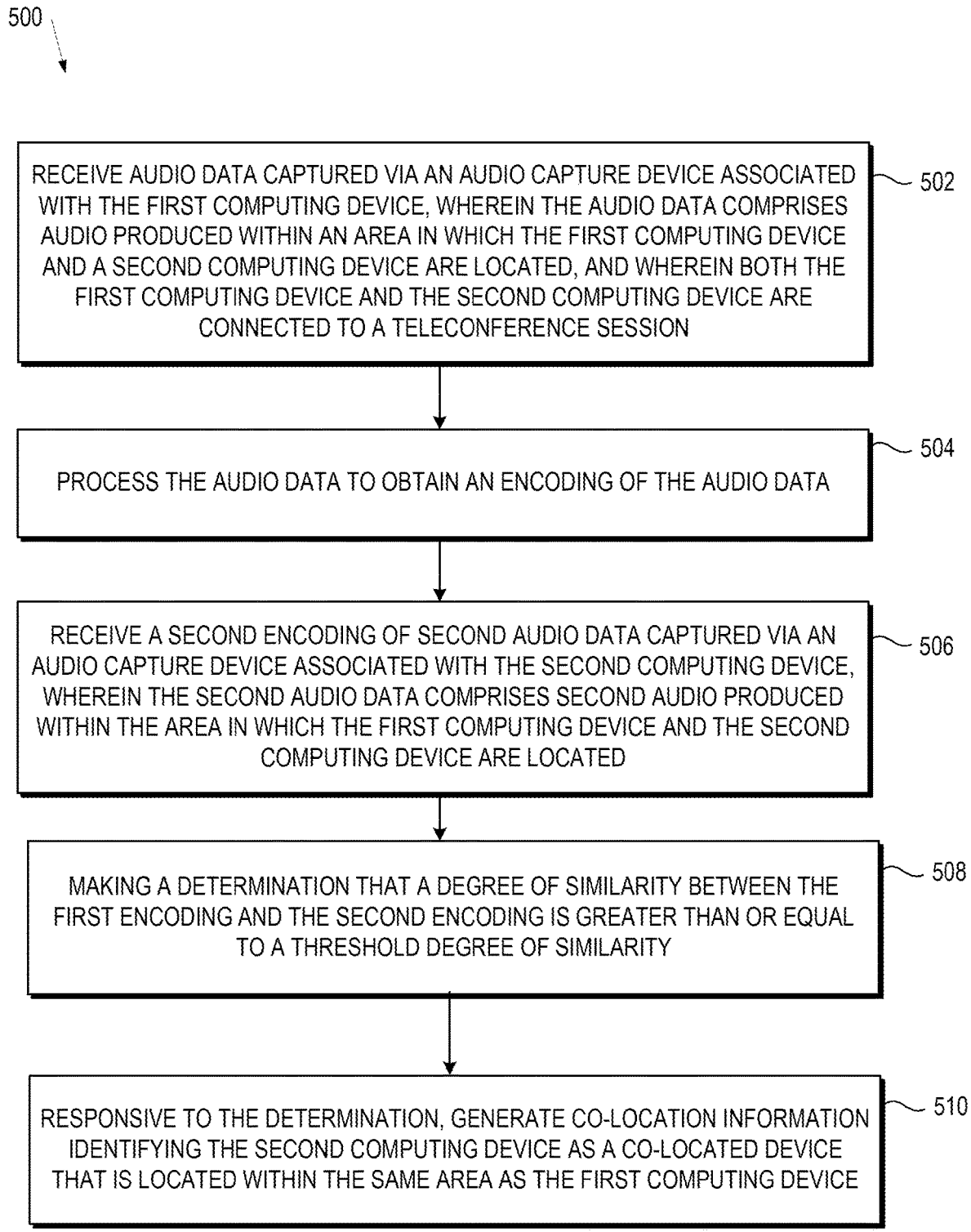
FIG. 5 is a flow diagram of an example method for locally detecting co-located devices via exchange of encodings of locally captured audio according to some implementations of the present disclosure.

FIG. 5 is a flow diagram of an example method 500 for locally detecting co-located devices via exchange of encodings of locally captured audio according to some implementations of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the co-location detector 106 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, processing logic of a computing device can receive audio data captured via an audio capture device associated with the computing device. The audio data can include audio produced within an area in which the computing device and another computing device are located. The audio produced within the area can be any type or manner of audio, such as background audio (e.g., cars driving past a building, someone speaking at another table in a coffee shop, a chair squeaking on the ground, etc.), a spoken utterance, background music being played within the area, a presentation being given within the area, audio produced by an audio output device within the area, etc.

In some implementations, the area in which the computing device and the other computing device are located can be a particular acoustic environment. As described herein, an "acoustic environment" can refer to an area in which sound occurring within the area is audible to devices located within the area. For example, if the computing device and the other computing device are located within a large atrium, the particular acoustic environment in which the devices are located can refer to a particular corner of the atrium. For another example, if the computing devices are both located within a coffee shop, the particular acoustic environment can refer to a particular seating area in which sounds from the road outside the coffee shop are audible.

Both the computing device and the other computing device can be connected to a teleconference session. For example, both devices can be located within the same classroom to participate in a college lecture. A computing system can host a teleconference in which the lecture occurs, and both computing devices can join the teleconference. For another example, both devices can be located within the same conference room to participate in a business meeting. For yet another example, both devices can be located within an outdoor area.

At operation 504, the processing logic can process the audio data to obtain an encoding of the audio data. The encoding of the audio data can be generated in the same manner as described with regards to the encoding generator 316 of FIG. 3. In particular, the encoding can include hash representations of particular portions of the captured audio data. For example, the captured audio data can include a plurality of audio features, such as spectral peaks, etc. Each of the audio features can be represented by a hash value. Alternatively, a pair of audio features or a larger grouping of audio features can be represented by a hash value.

At operation 506, the processing logic can receive an encoding of audio data captured via an audio capture device associated with the other computing device. This audio data can include audio produced within the same area in which the first computing device and the second computing device are located. For example, assume that an emergency vehicle passes the area in which the computing devices are located while the devices capture audio data. A portion of the audio data from both of the computing devices can include audio from the siren of the emergency vehicle. The generated encoding and the received encoding can both encode that portion of the audio data in the same manner. In this fashion, the shared acoustic environment of the computing devices can be captured without necessitating probe signal generation and capture.

At operation 508, the processing logic can make a determination that a degree of similarity between the first encoding and the second encoding is greater than or equal to a threshold degree of similarity. The determination can be made in the same manner as described with regards to the encoding similarity evaluator 324 of FIG. 3.

At operation 510, the processing logic can, responsive to the determination, generate co-location information identifying the other computing device as a co-located device that is located within the same area as the first computing device. The processing logic can generate the co-location information in the same manner as described with regards to the co-location detector 302 of FIG. 3. In such fashion, co-located devices can be detected and identified without generation of probe signals, although in some instances probe signals can enhance the accuracy of such identification techniques.

Figure 6:
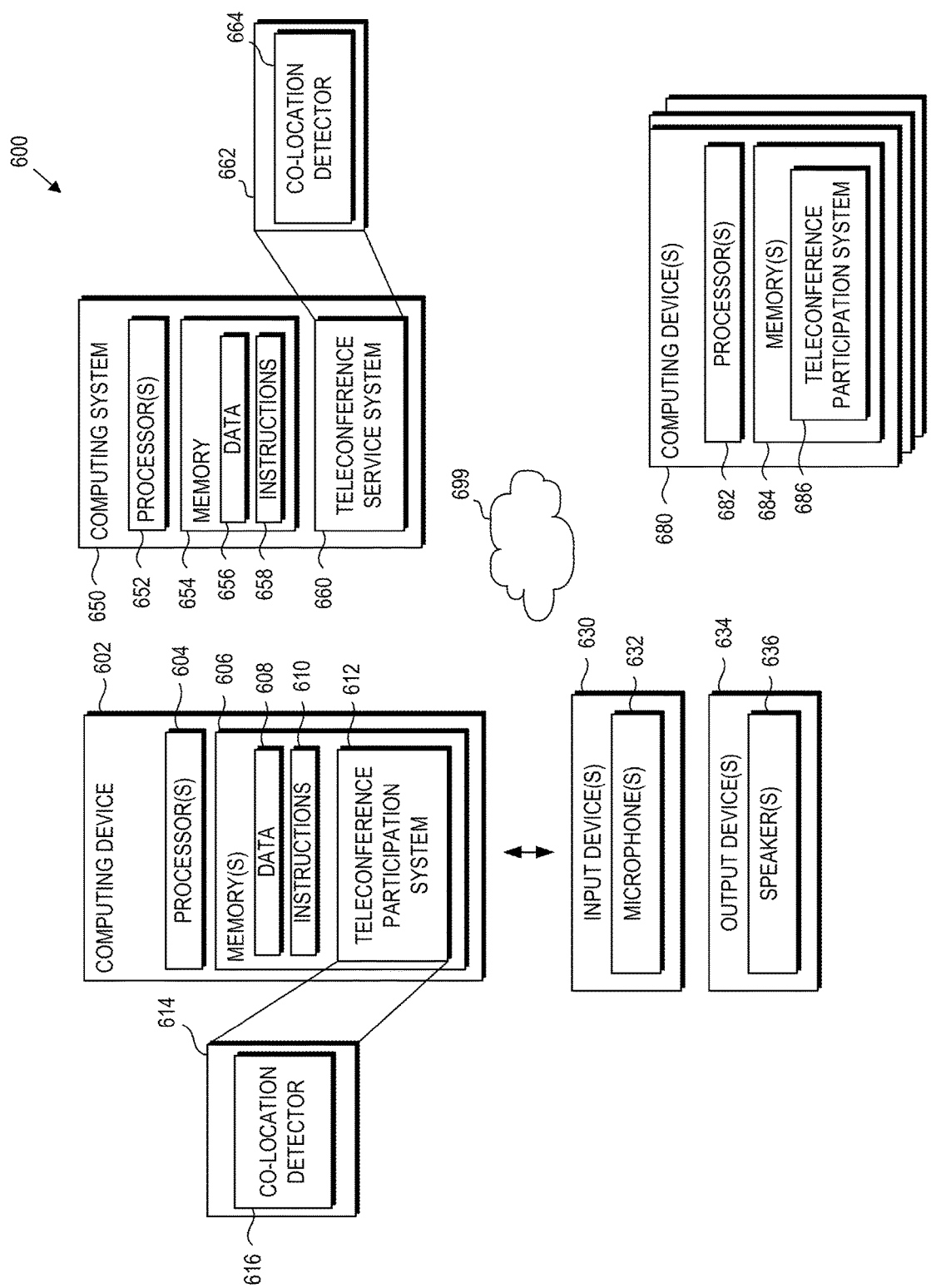
FIG. 6 is a block diagram of an example computing environment that performs various implementations of the present disclosure.

FIG. 6 is a block diagram of an example computing environment 600 that performs various implementations of the present disclosure. The computing environment 600 includes a participant computing device 602 that is associated with a participant in a teleconference, a teleconference computing system 650, and, in some implementations, other participant computing device(s) 680 respectively associated with other participants(s) in the teleconference.

The participant computing device 602 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), etc.

The participant computing device 602 includes processor(s) 604 and memory(s) 606. The processor(s) 604 can be any suitable processing device (e.g., a processor core, a microprocessor, an ASIC, an FPGA, a controller, a microcontroller, etc.) and can be one processor or processors that are operatively connected. The memory 606 can include non-transitory computer-readable storage media(s), such as RAM, ROM, EEPROM, EPROM, flash memory devices, magnetic disks, etc., and combinations thereof. The memory 606 can store data 608 and instructions 610 which are executed by the processor 604 to cause the participant computing device 602 to perform operations.

In particular, the memory 606 of the participant computing device 602 can include a teleconference participation system 612. The teleconference participation system 612 can facilitate participation in a teleconference by a participant associated with the participant computing device 602 (e.g., a teleconference hosted or otherwise orchestrated by teleconference computing system 650, etc.). To facilitate teleconference participation, the teleconference participation system 612 can include service module(s) 614 which, by providing various services, can collectively facilitate participation in a teleconference.

For example, the teleconference service module(s) 614 can include a co-location detector 616. The co-location detector 616 can detect and identify co-located devices based on encodings of probe signals as described with regards to the co-location detector 302 of FIG. 3 and the co-location detector 106 of FIG. 1.

The participant computing device 602 can also include input device(s) 630 that receive inputs from a participant, or otherwise capture data associated with a participant. For example, the input device(s) 630 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the participant computing device 602 can include, or can be communicatively coupled to, input device(s) 630. For example, the input device(s) 630 can include a camera device that can capture two-dimensional video data of a participant associated with the participant computing device 602 (e.g., for broadcasting, etc.). In some implementations, the input device(s) 630 can include a number of camera devices communicatively coupled to the participant computing device 602 that are configured to capture image data from different perspectives for generation of three-dimensional pose data/representations (e.g., a representation of a user of the participant computing device 602, etc.).

In some implementations, the input device(s) 630 can include sensor devices configured to capture sensor data indicative of movements of a participant associated with the participant computing device 602 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In particular, the input device(s) 630 can include microphone(s) 632. The microphone(s) 632 can be audio capture devices capable of detecting probe signals from other computing devices. For example, if one computing device generates a probe signal at a frequency inaudible to human ears, the microphone(s) 632 can be configured to capture such a probe signal.

In some implementations, the participant computing device 602 can include, or be communicatively coupled to, output device(s) 634. Output device(s) 634 can be, or otherwise include, device(s) configured to output audio data, image data, video data, etc. For example, the output device(s) 634 can include a two-dimensional display device (e.g., a television, projector, smartphone display device, etc.). For another example, the output device(s) 634 can include display devices for an augmented reality device or virtual reality device.

In particular, the output device(s) 634 can include speakers 636. The speakers 636 can be configured to play probe signals that can be received within a certain range of the participant computing device 602. The speakers 636 can be configured to produce probe signals that are inaudible or audible to humans.

The teleconference computing system 650 includes processor(s) 652 and a memory 654. The processor(s) 652 can be any suitable processing device (e.g., a processor core, a microprocessor, an ASIC, an FPGA, a controller, a microcontroller, etc.) and can be one processor or processors that are operatively connected. The memory 654 can include non-transitory computer-readable storage media(s), such as RAM, ROM, EEPROM, EPROM, flash memory devices, magnetic disks, etc., and combinations thereof. The memory 654 can store data 656 and instructions 658 which are executed by the processor 652 to cause the teleconference computing system 650 to perform operations.

In some implementations, the teleconference computing system 650 can be, or otherwise include, a virtual machine or containerized unit of software instructions executed within a virtualized cloud computing environment (e.g., a distributed, networked collection of processing devices), and can be instantiated on request (e.g., in response to a request to initiate a teleconference, etc.). Additionally, or alternatively, in some implementations, the teleconference computing system 650 can be, or otherwise include, physical processing devices, such as processing nodes within a cloud computing network (e.g., nodes of physical hardware resources).

The teleconference computing system 650 can facilitate the exchange of communication data within a teleconference using the teleconference service system 660. More specifically, the teleconference computing system 650 can utilize the teleconference service system 660 to encode, broadcast, and/or relay communications signals (e.g., audio input signals, video input signals, etc.), host chat rooms, relay teleconference invites, provide web applications for participation in a teleconference (e.g., a web application accessible via a web browser at a teleconference computing system, etc.), etc.

More generally, the teleconference computing system 650 can utilize the teleconference service system 660 to handle any frontend or backend services directed to providing a teleconference. For example, the teleconference service system 660 can receive and broadcast (i.e., relay) data (e.g., video data, audio data, etc.) between the participant computing device 602 and participant computing device(s) 680. For another example, the teleconference service system 660 can facilitate direct communications between the participant computing device 602 and participant computing device(s) 680 (e.g., peer-to-peer communications, etc.). A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As an example, the teleconference service system 660 can provide a videoconference service for multiple participants. One of the participants can transmit audio and video data to the teleconference service system 660 using a participant device (e.g., participant computing device 602, etc.). A different participant can transmit audio data to the teleconference service system 660 with a different participant computing device. The teleconference service system 660 can receive the data from the participants and broadcast the data to each computing system.

As another example, the teleconference service system 660 can implement an augmented reality (AR) or virtual reality (VR) conferencing service for multiple participants. One of the participants can transmit AR/VR data sufficient to generate a three-dimensional representation of the participant to the teleconference service system 660 via a device (e.g., video data, audio data, sensor data indicative of a pose and/or movement of a participant, etc.). The teleconference service system 660 can transmit the AR/VR data to devices of the other participants. In such fashion, the teleconference service system 660 can facilitate any type or manner of teleconferencing services to multiple participants.

It should be noted that the teleconference service system 660 can facilitate the flow of data between participants (e.g., participant computing device 602, participant computing device(s) 680, etc.) in any manner that is sufficient to implement the teleconference service. In some implementations, the teleconference service system 660 can be configured to receive data from participants, decode the data, encode the data, broadcast the data to other participants, etc. For example, the teleconference service system 660 can receive encoded video data from the participant computing device 602. The teleconference service system 660 can decode the video data according to a video codec utilized by the participant computing device 602. The teleconference service system 660 can encode the video data with a video codec and broadcast the data to participant computing devices.

In particular, to facilitate teleconference participation, the teleconference service system 660 can include hosting module(s) 662 which fulfill or orchestrate various teleconferencing services that collectively provide a teleconference for participants.

For example, the teleconference hosting module(s) 662 can include a co-location detector 664. The co-location detector 664 can perform some of the operations performed by the co-location detector 302 of FIG. 3, and/or the co-location detector 106 of FIG. 1. For example, the co-location detector 664 can evaluate a similarity between encodings, generate encodings such as hash representations, perform corrective actions, identify fingerprints, etc.

In some implementations, the teleconference computing system 650 includes, or is otherwise implemented by, server computing device(s). In instances in which the teleconference computing system 650 includes multiple server computing devices, such server computing devices can operate according to sequential computing architectures, parallel computing architectures, or some combination thereof.

In some implementations, the transmission and reception of data by teleconference computing system 650 can be accomplished via the network 699. For example, in some implementations, the participant computing device 602 can capture video data, audio data, multimedia data (e.g., video data and audio data, etc.), sensor data, etc. and transmit the data to the teleconference computing system 650. The teleconference computing system 650 can receive the data via the network 699.

In some implementations, the teleconference computing system 650 can receive data from the participant computing device(s) 602 and 680 according to various encryption scheme(s) (e.g., codec(s), lossy compression scheme(s), lossless compression scheme(s), etc.). For example, the participant computing device 602 can encode audio data with an audio codec, and then transmit the encoded audio data to the teleconference computing system 650. The teleconference computing system 650 can decode the encoded audio data with the audio codec. In some implementations, the participant computing device 602 can dynamically select between a number of different codecs with varying degrees of loss based on conditions (e.g., available network bandwidth, accessibility of hardware/software resources, etc.) of the network 699, the participant computing device 602, and/or the teleconference computing system 650. For example, the participant computing device 602 can dynamically switch from audio data transmission according to a lossy encoding scheme to audio data transmission according to a lossless encoding scheme based on a signal strength between the participant computing device 602 and the network 699.

The teleconference computing system 650 and the participant computing device 602 can communicate with the participant computing device(s) 680 via the network 699. The participant computing device(s) 680 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device(s) 680 includes processor(s) 682 and a memory 684 as described with regards to the participant computing device 602. Specifically, the participant computing device(s) 680 can be the same, or similar, device(s) as the participant computing device 602. For example, the participant computing device(s) 680 can each include a teleconference participation system 686 that includes at least some of the modules 614 of the teleconference participation system 612. For another example, the participant computing device(s) 680 may include, or may be communicatively coupled to, the same type of input and output devices as described with regards to input device(s) 630 and output device(s) 634 (e.g., device(s) 632, device(s) 636, etc.). Alternatively, in some implementations, the participant computing device(s) 680 can be different devices than the participant computing device 602, but can also facilitate teleconferencing with the teleconference computing system 650. For example, the participant computing device 602 can be a laptop and the participant computing device(s) 680 can be smartphone(s).

The network 699 can be any type of communications network, such as a local area network (e.g., intranet), wide area network (e.g., Internet), or some combination thereof and can include any number of wired or wireless links. In general, communication over the network 699 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Broadcast: as used herein, the terms "broadcast" or "broadcasting" generally refers to any transmission of data (e.g., audio data, video data, AR/VR data, etc.) from a central entity (e.g., computing device, computing system, etc.) for potential receipt by one or more other entities or devices. A broadcast of data can be performed to orchestrate or otherwise facilitate a teleconference that includes a number of participants. For example, a central entity, such as a teleconference server system, can receive an audio transmission from a participant computing device associated with one participant and broadcast the audio transmission to a number of participant computing devices associated with other participants of a teleconference session. For another example, a central entity can detect that direct peer-to-peer data transmission between two participants in a private teleconference is not possible (e.g., due to firewall settings, etc.) and can serve as a relay intermediary that receives and broadcasts data transmissions between participant computing devices associated with the participants. In some implementations, broadcast or broadcasting can include the encoding and/or decoding of transmitted and/or received data. For example, a teleconference computing system broadcasting video data can encode the video data using a codec. Participant computing devices receiving the broadcast can decode the video using the codec.

In some implementations, a broadcast can be, or otherwise include, wireless signaling that carries data, such as communications data, received in a transmission from a participant computing device. Additionally, or alternatively, in some instances, a broadcast can carry data obtained from a data store, storage device, content provider, application programming interface (API), etc. For example, a central entity can receive transmissions of audio data from a number of participant computing devices. The central entity can broadcast the audio data alongside video data obtained from a video data repository. As such, the broadcast of data is not limited to data received via transmissions from participant computing devices within the context of a teleconference.

Communications data: as used herein, the term "communications data" generally refers to any type or manner of data that carries a communication, or otherwise facilitates communication between participants of a teleconference. Communications data can include audio data, video data, textual data, augmented reality/virtual reality (AR/VR) data, etc. As an example, communications data can collectively refer to audio data and video data transmitted within the context of a videoconference. As another example, within the context of an AR/VR conference, communications data can collectively refer to audio data and AR/VR data, such as positioning data, pose data, facial capture data, etc. that is utilized to generate a representation of the participant within a virtual environment. As yet another example, communications data can refer to textual content provided by participants (e.g., via a chat function of the teleconference, via transcription of audio transmissions using text-to-speech technologies, etc.).

Cloud: as used herein, the term "cloud" or "cloud computing environment" generally refers to a network of interconnected computing devices (e.g., physical computing devices, virtualized computing devices, etc.) and associated storage media which interoperate to perform computational operations such as data storage, transfer, and/or processing. In some implementations, a cloud computing environment can be implemented and managed by an information technology (IT) service provider. The IT service provider can provide access to the cloud computing environment as a service to various users, who can in some circumstances be referred to as "cloud customers."

Participant: as used herein, the term "participant" generally refers to any user (e.g., human user), virtualized user (e.g., a bot, etc.), or group of users that participate in a live exchange of data (e.g., a teleconference such as a videoconference, etc.). More specifically, participant can be used throughout the subject specification to refer to user(s) within the context of a teleconference. As an example, a group of participants can refer to a group of users that participate remotely in a teleconference with their own participant computing devices (e.g., smartphones, laptops, wearable devices, teleconferencing devices, broadcasting devices, etc.). As another example, a participant can refer to a group of users utilizing a single participant computing device for participation in a teleconference (e.g., a videoconferencing device within a meeting room, etc.). As yet another example, participant can refer to a bot or an automated user (e.g., a virtual assistant, etc.) that participates in a teleconference to provide various services or features for other participants in the teleconference (e.g., recording data from the teleconference, providing virtual assistant services, providing testing services, etc.)

Teleconference: as used herein, the term "teleconference" generally refers to any communication or live exchange of data (e.g., audio data, video data, AR/VR data, etc.) between multiple participant computing devices. The term "teleconference" encompasses a videoconference, an audioconference, a media conference, an Augmented Reality (AR)/Virtual Reality (VR) conference, and/or other forms of the exchange of data (e.g., communications data) between participant computing devices. As an example, a teleconference can refer to a videoconference in which multiple participant computing devices broadcast and/or receive video data and/or audio data in real-time or near real-time. As another example, a teleconference can refer to an AR/VR conferencing service in which AR/VR data (e.g., pose data, image data, positioning data, audio data, etc.) sufficient to generate a three-dimensional representation of a participant is exchanged amongst participant computing devices in real-time. As yet another example, a teleconference can refer to a conference in which audio signals are exchanged amongst participant computing devices over a mobile network. As yet another example, a teleconference can refer to a media conference in which one or more different types or combinations of media or other data are exchanged amongst participant computing devices (e.g., audio data, video data, AR/VR data, a combination of audio and video data, etc.).

Transmission: As used herein, the term "transmission" generally refers to any sending, providing, etc. of data (e.g., communications data) from one entity to another entity. For example, a participant computing device can directly transmit audio data to another participant computing device. For another example, a participant computing device can transmit video data to a central entity orchestrating a teleconference, and the central entity can broadcast the audio data to other entities participating in the teleconference. Transmission of data can occur over any number of wired and/or wireless communications links or devices. Data can be transmitted in various forms and/or according to various protocols. For example, data can be encrypted and/or encoded prior to transmission and decrypted and/or decoded upon receipt.

Transmission quality: As used herein, the term "transmission quality" generally refers to a perceivable quality of a transmission of communications data. In particular, transmission quality can refer to, or otherwise account for a technical quality of the transmission, such as degree of loss associated with the transmission, a resolution, a bitrate, etc. Additionally, or alternatively, the term transmission can refer to a semantic quality of the transmission, such as a degree of background noise, a clarity associated with spoken utterances of participants, etc. As such, it should be broadly understood that the "transmission quality" of a transmission can be determined in accordance with a variety of factors.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
    receiving, by a first computing device comprising one or more processor devices, audio data captured via an audio capture device associated with the first computing device, wherein the audio data comprises probe signals from one or more second computing devices located within a same area as the first computing device, and wherein the first computing device and the one or more second computing devices are connected to a teleconference session;
    based on the audio data, generating, by the first computing device, a first encoding of the probe signals received by the first computing device;
    receiving, by the first computing device, a second encoding of probe signals received at a second computing device of the one or more second computing devices;
    making, by the first computing device, a determination that a degree of similarity between the first encoding and the second encoding is greater than or equal to a threshold degree of similarity; and
    responsive to the determination, generating, by the first computing device, co-location information identifying the second computing device as a co-located device that is located within the same area as the first computing device.

2. The computer-implemented method of claim 1, wherein generating the first encoding of the probe signals comprises:
    identifying, by the first computing device, a plurality of signal components from the probe signals from the one or more second computing devices; and
    generating, by the first computing device, a plurality of hash values based on the plurality of signal components, wherein the first encoding comprises the plurality of hash values.

3. The method of claim 2, wherein each of the plurality of signal components comprises a combination of tones randomly selected from a finite set of frequency values.

4. The computer-implemented method of claim 2, wherein generating, by the first computing device, the plurality of hash values comprises:
    determining, by the first computing device, a plurality of signal component pairs from the plurality of signal components, wherein each of the signal component pairs comprises two signal components of a same component type, and wherein the two signal components are received at different times; and
    generating, by the first computing device, signal component pair information descriptive of the plurality of signal component pairs, wherein, for each of the plurality of signal component pairs, the signal component pair information comprises:
        two respective component identifiers for the two signal components; and
        a difference between the different times at which the two signal components are received; and
    processing, by the first computing device, the signal component pair information with a hashing schema to obtain the plurality of hash values, wherein each of the plurality of hash values is derived from the signal component pair information for a corresponding signal component pair of the plurality of signal component pairs.

5. The computer-implemented method of claim 4, wherein identifying the plurality of signal component pairs from the plurality of signal components comprises:
    selecting, by the first computing device, a first signal component of the plurality of signal components, wherein the first signal component is received at a first time, and wherein the first signal component comprises a first component type;
    identifying, by the first computing device, a plurality of second signal components of the plurality of signal components, wherein each of the plurality of second signal components comprises the first component type, and wherein each of the plurality of second signal components is received at a time prior to the first time; and
    determining, by the first computing device, a subset of signal component pairs of the plurality of signal component pairs, wherein each signal component pair of the subset of signal component pairs comprises the first signal component and a second signal component of the plurality of second signal components.

6. The computer-implemented method of claim 5, wherein the method comprises:
  determining, by the first computing device, a randomized probe signal comprising a combination of random signal components; and
  causing, by the first computing device, playback of the randomized probe signal via an audio output device associated with the first computing device.

7. The computer-implemented method of claim 6, wherein, prior to determining the randomized probe signal, the method comprises:
  providing, by the first computing device, session join information indicative of a request to join to the teleconference session; and
  responsive to providing the session join information, joining, by the first computing device, the teleconference session.

8. The computer-implemented method of claim 6, wherein, prior to determining the randomized probe signal, the method comprises:
  receiving, by the first computing device, identifying instructions comprising instructions to cause playback of the randomized probe signal.

9. The computer-implemented method of claim 6, wherein selecting the first signal component of the plurality of signal components comprises:
  selecting, by the first computing device, the first signal component of the plurality of signal components, wherein the first signal component comprises a random signal component from the combination of random signal components of the randomized probe signal.

10. The computer-implemented method of claim 6, wherein selecting the first signal component of the plurality of signal components comprises:
  selecting, by the first computing device, the first signal component of the plurality of signal components, wherein the first signal component comprises a signal component from the probe signals from the one or more respective second computing devices.

11. The computer-implemented method of claim 6, wherein receiving the second encoding of the probe signals received at the second computing device comprises:
  receiving, by the first computing device, a plurality of second hash values, wherein each of the plurality of second hash values is derived from a corresponding second signal component pair of a plurality of second signal component pairs identified by the second computing device from the plurality of signal components of the probe signals received at the second computing device.

12. The computer-implemented method of claim 11, wherein making the determination that the degree of similarity between the first encoding and the second encoding is greater than or equal to the threshold degree of similarity comprises:
  identifying, by the first computing device, a number N of common hash values that are included in both the plurality of hash values and the plurality of second hash values; and
  determining, by the first computing device, that the number N of common hash values is greater than a threshold number M of common hash values.

13. The computer-implemented method of claim 12, wherein a hash value of the N common hash values is based on a second signal component pair that comprises one of the combination of random signal components of the randomized probe signal.

14. The computer-implemented method of claim 1, wherein the method further comprises:
  performing, by the computing device, a corrective action responsive to generating the co-location information.

15. The computer-implemented method of claim 14, wherein performing the corrective action comprises:
  modifying, by the computing device, one or more parameters comprising at least one of:
    a playback volume parameter associated with a playback volume of an audio output device associated with the first computing device;
    a recording sensitivity parameter associated with a recording sensitivity of the audio capture device; or
    a suppression parameter associated with activation of a noise suppression process.

16. The computer-implemented method of claim 14, wherein performing the corrective action comprises:
  providing, by the first computing device, the co-location information to the second computing device of the one or more second computing devices and/or to a computing system that hosts the teleconference session.

17. The computer-implemented method of claim 1, wherein receiving the second encoding of the probe signals received at the second computing device comprises:
  receiving, by the first computing device from a sending entity, the second encoding of the probe signals received at the second computing device of the one or more second computing devices, wherein the sending entity comprises:
    the second computing device of the one or more second computing devices; or
    a computing system that hosts the teleconference.

18. The computer-implemented method of claim 1, wherein the method further comprises:
  receiving, by the first computing device, a third encoding of probe signals received at an additional second computing device of the one or more second computing devices;
  making, by the first computing device, a determination that a degree of similarity between the first encoding and the third encoding is greater than or equal to a threshold degree of similarity; and
  responsive to the determination, generating, by the first computing device, second co-location information identifying the additional second computing device as a co-located device that is located within the same area as the first computing device.

19. A computing system comprising:
  one or more processor devices; and
  one or more non-transitory computer-readable media comprising instructions that when executed by the one or more processor devices cause the computing system to perform operations, the operations comprising:
    receiving session join information from a first computing device, wherein the session join information is indicative of a request to join a teleconference session hosted by the computing system, and wherein a plurality of second computing devices are connected to the teleconference session;
    responsive to receiving the session join information, providing, to the first computing device, instructions to perform a session join process, wherein the session join process comprises playback of a probe signal for detection of co-located devices that are connected to the teleconference and are located within a same area as the first computing device;

receiving a first encoding from the first computing device and a second encoding from a second computing device of the plurality of second computing devices, wherein the first encoding is based on probe signals received at the first computing device, and wherein the second encoding is based on probe signals received at the second computing device; and determining that the first computing device and the second computing device are co-located based on a degree of similarity between the first encoding and the second encoding.

20. One or more non-transitory computer-readable media comprising instructions that when executed by one or more processors of a first computing device cause the first computing device to perform operations, the operations comprising:

receiving audio data captured via an audio capture device associated with the first computing device, wherein the audio data comprises probe signals from one or more respective second computing devices located within a same area as the first computing device, and wherein the first computing device and the one or more second computing devices are connected to a teleconference session;

based on the audio data, identifying a plurality of first signal components from the probe signals received by the first computing device from the one or more second computing devices;

determining a plurality of first signal component pairs from the plurality of first signal components, wherein each of the first signal component pairs comprises two signal components of a same component type that are received at different times; and generating a first plurality of hash values, wherein each of the first plurality of hash values is based on a corresponding first signal component pair of the plurality of first signal component pairs.

* * * * *